UNITED STATES PATENT OFFICE.

MAURICE ROGER RAFFIN, OF DUNKIRK, FRANCE, ASSIGNOR TO SOCIÉTÉ P. RAFFIN & FILS, OF DUNKIRK, FRANCE, A CORPORATION OF FRANCE.

CONCENTRATION OF TITANIUM ORES.

1,256,368.   Specification of Letters Patent.   Patented Feb. 12, 1918.

No Drawing.   Application filed July 6, 1917.   Serial No. 178,969.

*To all whom it may concern:*

Be it known that I, MAURICE ROGER RAFFIN, a citizen of the Republic of France, and a resident of 16 Rue Carnot, Dunkirk, France, have invented certain new and useful Improvements in Concentration of Titanium Ores, of which the following is a specification.

This invention relates to a process of treating ilmenites or titanic iron ores for the purpose of concentrating them to a high proportion of titanic oxid ($TiO_2$). It is known that these ores are titanates of iron, combinations of $TiO_2$ with $FeO$ and $Fe_2O_3$. These ilmenites occur in nature in the form of sands produced by disintegration of ancient rocks.

Silica and other impurities can be sorted out from ilmenite by magnetic separation. The product of this purification is mixed with charcoal or other coal in the form of powder, in the desired proportion to obtain reduction of the iron oxids to be eliminated. To the said mixture is added oil or tar, and it is heavily rammed in closed receptacles or crucibles which are slowly heated to a temperature close to 1000° C., that is to say to a comparatively low temperature. Above 1100° C. there takes place the phenomenon of re-oxidation of iron, and the result becomes negative. When a mixture of ilmenite and carbon reaches reduction temperature, carbonic oxid is abundantly freed, causes a violent ebullition and carries the carbon out of the crucible, so that the result becomes negative. But the addition of an agglutinant, such as oil or tar, has the effect of impeding the ebullition, forming with the ilmenite and carbon a porous mass which remains friable to such extent that it may be reduced to powder form by pressure of the fingers. Oil or tar is chosen by preference because only a very small quantity is needed to permeate and agglutinate the mixture of ore and carbon, and because in addition to its physical action just explained, these substances present the further advantage of performing a chemical rôle by leaving a carbonaceous residue ("carbone de pyrogenation") which incases the grains of ilmenite and contributes to the reduction of the iron oxid. After cooling, the contents of the receptacles are thrown into vats containing very diluted sulfuric acid. The product of the reaction is a titaniferous residue containing very little iron. It is washed, then dried or calcined. The sulfate of iron obtained as a by-product is collected by crystallization. Instead of sulfuric acid, hydrochloric acid could also be used.

What I claim as my invention and desire to secure by Letters Patent is:—

1. A process for the treatment of ilmenites or titanic iron ores for concentrating to a high content of titanic oxid ($TiO_2$), said process consisting in mixing ilmenite with pulverized carbon, adding an agglutinant to this mixture, heating the same, treating with a dilute acid capable of reacting on the iron, washing and then drying or calcining the titaniferous residue thus obtained.

2. A process for the treatment of ilmenites or titanic iron ores for concentrating to a high content of titanic oxid ($TiO_2$), said process consisting in mixing ilmenite with pulverized carbon, adding an agglutinant to this mixture, heating the same to a temperature between 900° C. to 1100° C., treating with a dilute acid capable of reacting on the iron, washing and then drying or calcining the titaniferous residue thus obtained.

3. A process for the treatment of ilmenites or titanic iron ores for concentrating to a high content of titanic oxid ($TiO_2$), said process consisting in depriving ilmenite of silica and other impurities by magnetic separation, mixing the purified ilmenite with pulverized carbon, adding an agglutinant to this mixture, heating the same, treating with a dilute acid capable of reacting on the iron, washing and then drying or calcining the titaniferous residue thus obtained.

4. A process for the treatment of ilmenites or titanic iron ores for concentrating to a high content of titanic oxid ($TiO_2$), said process consisting in mixing ilmenite with pulverized charcoal, adding to this mixture a carbonaceous agglutinant, heating in a crucible to a temperature between 900° C. and 1100° C., subjecting the reaction product to the action of dilute sulfuric acid, washing and then drying or calcining the titaniferous residue thus obtained.

5. A process for the treatment of ilmenites or titanic iron ores for concentrating to a high content of titanic oxid ($TiO_2$), said process consisting in mixing ilmenite with pulverized charcoal, adding tar to this mixture, heating in a crucible to a temperature between 900° C. and 1100° C., subjecting the reaction product to the action of dilute sulfuric acid, washing and then drying or calcining the titaniferous residue thus obtained.

6. In a process for concentrating titanic iron ores to a high content of titanic oxid ($TiO_2$) wherein the ore is mixed with carbon in pulverulent form and brought to reaction temperature, the novel step of combining an agglutinant with the mixture to restrain the ebullience occurring during the reaction.

7. In a process for concentrating titanic iron ores to a high content of titanic oxid ($TiO_2$) wherein the ore is mixed with carbon in pulverulent form and brought to reaction temperature, the novel step of combining a carbonaceous agglutinant with the mixture to restrain the ebullience occurring during the reaction and to further the reduction of the iron oxid.

In testimony whereof I have signed my name to this specification, in the presence of two subscribing witnesses.

MAURICE ROGER RAFFIN.

Witnesses:
  CH. DONY,
  M. DEFÉVRIMONT.